United States Patent [19]

Neely, Jr.

[11] 4,287,708

[45] Sep. 8, 1981

[54] ALFALFA HARVESTING AND PROCESSING APPARATUS

[76] Inventor: Allen B. Neely, Jr., 676 S. Oakland, Aurora, Colo. 80012

[21] Appl. No.: 65,956

[22] Filed: Aug. 13, 1979

[51] Int. Cl.³ .............................................. A01D 43/00
[52] U.S. Cl. .................................. 56/13.5; 56/DIG. 2; 56/16.4; 241/73
[58] Field of Search ...................... 56/13.5, 13.6, 13.7, 56/13.8, 13.9, 16.4, DIG. 2; 241/73, 74; 100/96, 97, 121

[56] References Cited

U.S. PATENT DOCUMENTS

| | | | |
|---|---|---|---|
| 3,572,663 | 3/1971 | Lely | 56/16.4 |
| 3,661,082 | 5/1972 | French et al. | 100/96 |
| 3,677,478 | 7/1972 | Schutte | 241/189 R |
| 3,814,246 | 6/1974 | Wilson et al. | 210/78 |
| 4,109,448 | 8/1978 | Kline | 56/13.5 |

Primary Examiner—Robert A. Hafer
Attorney, Agent, or Firm—Frank C. Lowe; Horace B. Van Valkenburgh

[57] ABSTRACT

A harvesting apparatus adapted to move through a field of vegetation having a liquid component and a fiber component to mow and gather the vegetation and a processing means to grind the vegetation to a pulp as it is received, extract and collect the liquid component thereof, and condition and discharge the fiber therefrom.

15 Claims, 13 Drawing Figures

ALFALFA HARVESTING AND PROCESSING APPARATUS

The present invention relates to the extraction of liquid protein from alfalfa and similar leaf crops, and more particularly to apparatus to extract the same as the crop is being harvested. As such, the invention will be hereinafter called an "Alfalfa Harvesting and Processing Apparatus".

A primary object of the invention is to provide a processing apparatus to extract liquid leaf protein from alfalfa as the crop is being harvested and at the same time control the moisture content of the cut and chopped alfalfa fiber expelled from the apparatus so that it can be pelletized or otherwise used.

The present invention will be hereinafter described with reference to alfalfa, but it is recognized that other leaf crops can also be harvested and processed such as, for example, tobacco, sugar beet tops and the like. Alfalfa has a surprisingly high content of crude protein and also has significant amounts of the eight essential amino acids. In this respect it is superior to corn, soybeans, or wheat. Alfalfa is considered by some biochemists as having the best potential for solving the world's food needs as the world population increases.

A problem resides in handling the alfalfa in a manner which can best extract the protein and the amino acids. These components can best be obtained by crushing the freshly cut plants to extract the plant juices therefrom. Cutting and hauling the alfalfa to a crushing plant is time consuming and inefficient; also, losses can occur because the protein will ferment quickly. The operation should be completed as soon as the plant is cut. Proposals have been directed towards cutting the alfalfa in the field while, at the same time, extracting the liquid leaf protein. Donald C. Kline discloses such an operation in his U.S. Pat. No. 4,109,448, which was issued Aug. 29, 1978. Green alfalfa is cut, chopped and crushed to extract liquid from the plants. The liquid which contains the protein is thereafter treated to curd and separate the protein. The remaining deproteinized liquid and alfalfa fiber are then discharged.

This field extraction process is wasteful in that the discharged, deproteinized liquid and the alfalfa fiber are valuable. The liquid contains carbohydrate, dissolved minerals and also amino acids. The fiber contains residual liquid and can be pellitized to provide livestock feed. There is a need for an improved harvesting operation to retain and use these substances presently being discarded and also for improved chopping, pressing and drying operations to extract the plant liquid and to prepare the fiber for other uses such as pelletizing.

The present invention was conceived and developed with the foregoing and other considerations in view. The invention comprises, in essence, a field harvester and processor to cut, chop, grind, and press green alfalfa, or any other succulent plant, to extract liquid from the plant and then immediately store the liquid in a refrigerated container on the harvester to inhibit fermentation. At the same time the alfalfa fiber is deliquified for pelletizing before it is discharged. When a sufficient amount of liquid is collected, it may be transferred to a special tank on a pickup truck for transportation to a processing plant. Thus, all of the liquid will then be available for the extraction of all soluble components from it.

The invention further comprises a centrifuging operation to extract additional moisture from the alfalfa fiber after most of the moisture is extracted by a press operation. This permits better control of the moisture content of the fiber, necessary if it is to be pelletized.

It follows that the objects of the invention are to provide a novel and improved apparatus for harvesting and processing alfalfa which (a) removes the fluids from the alfalfa as it is being harvested; (b) controls the amount of liquid left in the fibrous alfalfa when it is discharged from the apparatus; (c) not only removes the liquid components from the alfalfa but also permits the remaining fibrous material to be further treated to remove fluid therefrom, leach out soluble components or add components to better condition the same for pelletizing or other uses; (d) provides for an organization of rugged cutters and grinding components to effectively rupture the cell structure of freshly cut alfalfa and (e) is a simple, sturdy, high-capacity, economical, rugged and durable apparatus.

With the foregoing and other objects in view, all of which more fully hereinafter appear, my invention comprises certain constructions, combinations and arrangement of parts and elements as hereinafter described, defined in the appended claims and illustrated in preferred embodiment by the accompanying drawings in which:

FIG. 10 is a sectional view of a roll press as taken from the indicated line 10—10 at FIG. 3;

Figure 1:
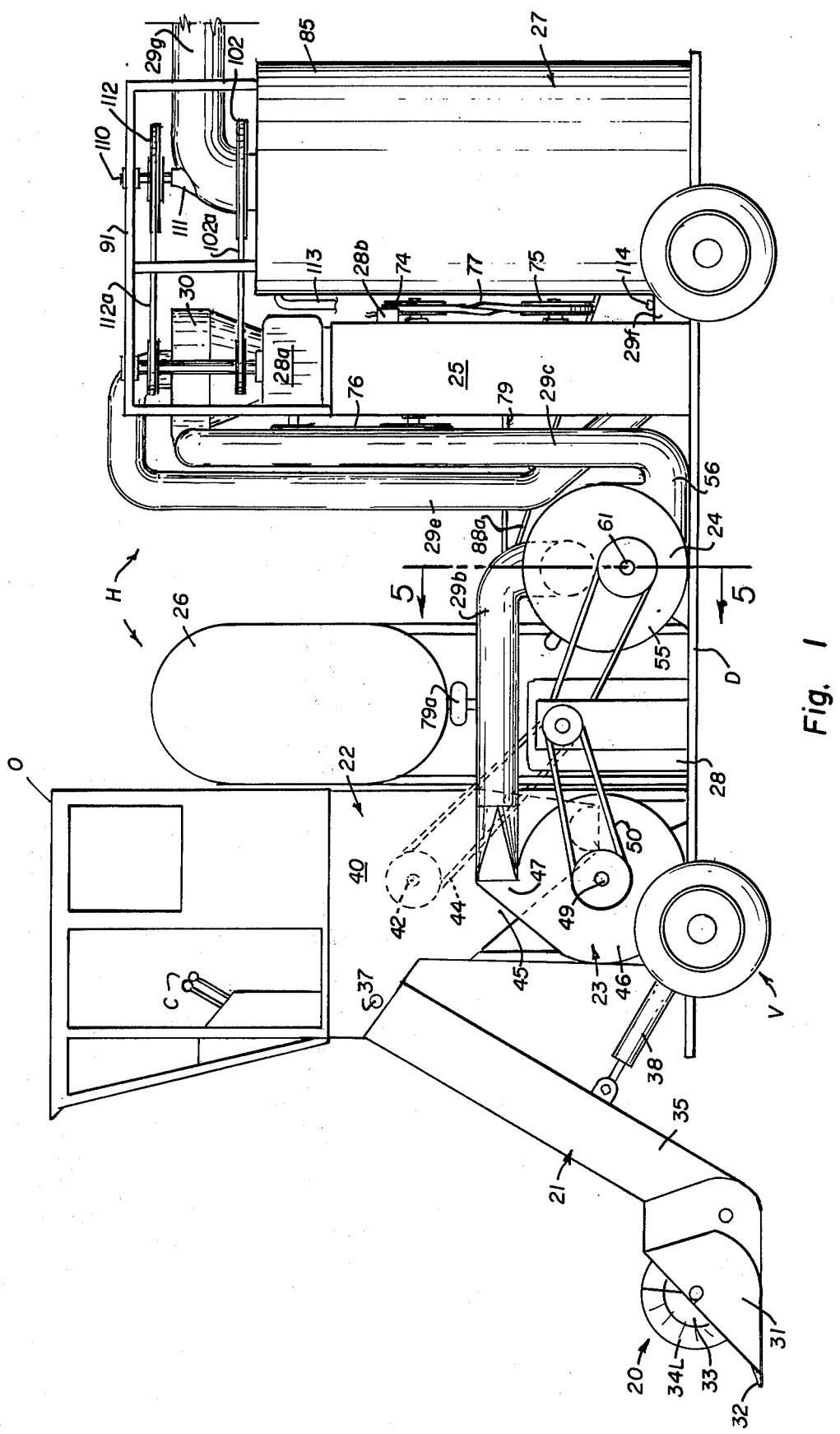
FIG. 1 is a left-side, side elevational view of a preferred form of the apparatus.
Figure 2:
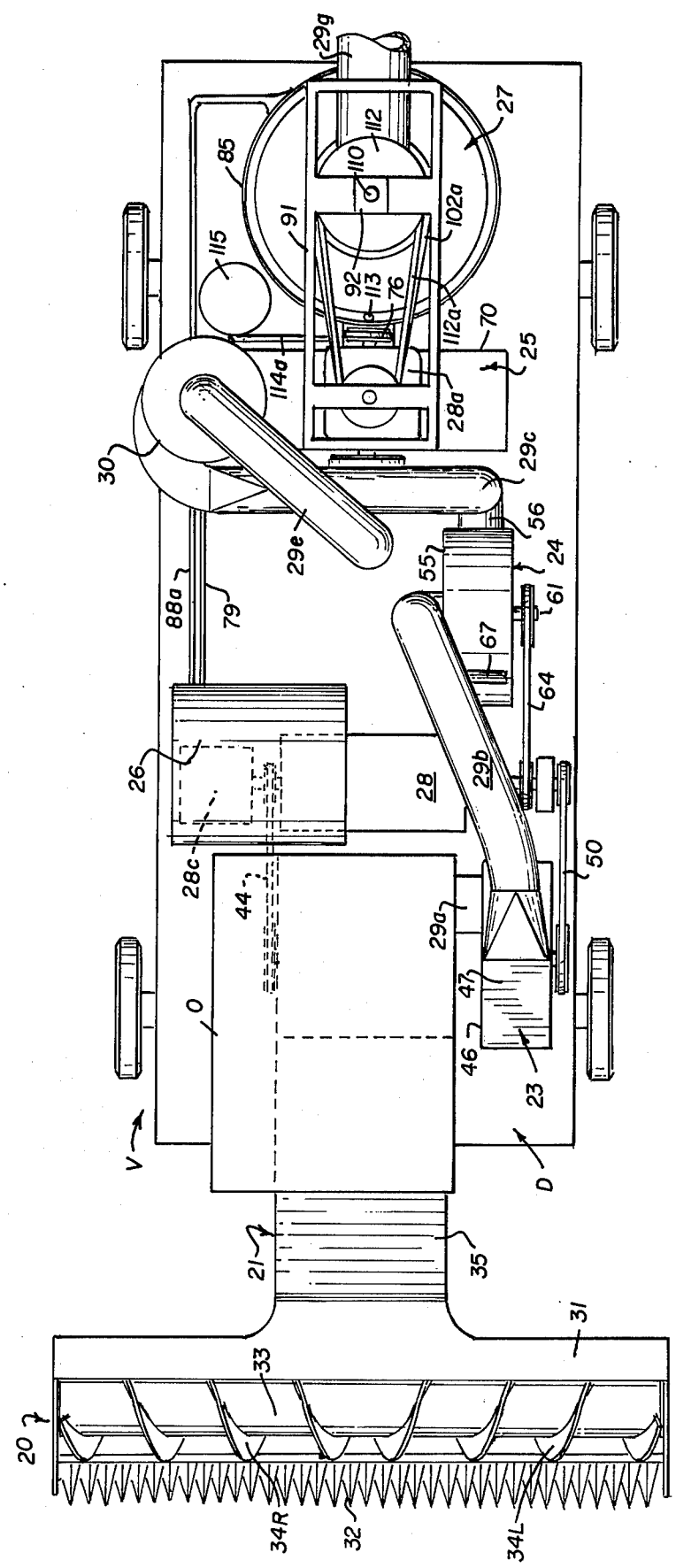
FIG. 2 is a plan view of the apparatus.

Referring more particularly to the drawing, the alfalfa harvesting apparatus H is shown as being carried upon the flat deck D of a wheel mounted vehicle V. The vehicle V will be a conventional unit, thus its structure is not shown in detail. Also, the motor components for driving and steering it are not shown. An operator's cab O is shown at a position above the harvesting apparatus at the forward end of the vehicle where the operator may have a good view of the field being harvested.

A seat S and controls C are located in this operator's cab.

The basic arrangement of the components which make up the alfalfa harvesting and processing apparatus H is as follows: A mower unit 20 at the front of the apparatus cuts a swath of alfalfa as the apparatus moves across a field. The cut alfalfa is shifted to the center of the mower 20, to a conveyor 21 and thence to the chamber of a first cutter 22. The alfalfa moves, from the first cutter 22, to a blower-chopper 23, to a hammer mill 24. By the time the alfalfa has passed through the hammer mill it is crushed to a pulp. This pulp is then conveyed to and through a roll press 25 where the liquid is extracted and diverted to a storage tank 26. The fiber is then moved from the roll press 25, to a centrifuge 27 for the removal of any remaining moisture therein. The fiber is then discharged from the centrifuge 27 to a wagon or truck following the harvesting apparatus H, such not being shown in the drawing.

These several components above described are powered by a suitable engine 28 mounted upon the deck D of the apparatus, and by auxiliary motors as needed. For example, an auxiliary motor 28a is shown as a drive for the roll press 25 and the centrifuge 27 and a small auxiliary motor 28b is shown as a drive for a brush in the roll press 25, as hereinafter further described. Also, the engine will include a suitable compressor 28c to provide compressed air to certain other components as hereinafter described. The engine, the motors, and the compressor are not shown in detail since they are entirely conventional. It is to be noted that the connections of the engine 28 to the several components described will be of a variable speed type for the best operation with a given crop.

The drive details for certain other components are not shown, or only partially shown, since these drives are essentially conventional and it is well within the skill of a skilled workman to build them.

The movement of the chopped and crushed alfalfa to and from the several components above described will be through suitable conduits 29a, 29b, 29c, 29d, 29e, 29f and 29g, preferably by an air flow generated by blower chopper 23. If needed, a supplementary air flow may be provided by booster blowers and also, mechanical means, such as auger flites can be used to convey the alfalfa particles through the conduits. A booster blower is located at the centrifuge 27 as hereinafter described. Auger flites are not shown since they are optional, and are conventional expedients which may be easily installed by a skilled workman.

In association with the conduits, a cyclone 30 is located at the entrance to the roll press 25. The conduit 29c enters the cyclone 30, the conduit 29d drops pulp from the cyclone and into the roll press 25, and the conduit 29e exhausts from the cyclone to enter the circuit at the base of the roll press. This permits the airflow in the conduit to be diverted around the rolls as hereinafter further described.

The mower unit 20 includes a transversely disposed scoop frame 31 with cutter 32 at the lower leading edge a transverse roller 33 having left and right auger flites 34R and 34L move alfalfa to the center of the unit as it is cut. Any conventional mower unit of this general type may be used which will function to cut and move the alfalfa to the conveyor 21. The mower unit will include drive mechanism and other components, such as a reel, which are not shown since they are entirely conventional.

The conveyor unit 21 may also be a conventional type which will function to move the cut alfalfa to the first cutter 22 located above the vehicle deck D. As such, this conveyor unit 21 will include a tubular housing 35 extending upwardly and rearwardly from the mower unit 20. A conveyor belt assembly 36 is mounted within the housing 35. The housing 35 supports the cutter scoop frame 30 and is pivoted to the body of the first cutter 22 as at 37. A hydraulic cylinder 38 between the housing 35 and the deck D provides for elevational adjustments to the conveyor scoop 30.

The conveyor unit 21 discharges alfalfa into the top of a rectangular chamber 40 forming the body of the first cutter 22. A cutting reel 41 within this chamber is mounted upon a transverse shaft 42 such that the blades of the reel 41 move past a fixed cutter bar 43. Rotation of the reel, as by a belt-pulley drive 44 connected to the engine 28, is to chop the alfalfa stems into small bits before it falls into a hopper below the reel. Rotation is in the direction of the indicated arrow 'a' at FIG. 3.

A discharge opening at the base of the hopper 45 connects with a short conduit section 29a which is extended to a side wall of the housing of the blower-chopper 33. The blower-chopper housing 46 forms a turbine and connects with a tangential discharge section 47 which merges into the conduit 29b for movement of the chopped alfalfa to the hammer mill 24. The hub of a radial array of turbine blades 48 is carried on a shaft 49 which is extended transversely through the housing 46 to form the blower. This shaft 49 connects with a belt-pulley drive 50 extended from the engine 28. Rotation is in the direction of the indicated arrow 'b' at FIGS. 3 and 5.

The hub of a radial array of knives 51 is also carried on the shaft 49 alongside the turbine blades and closely adjacent to the side wall of the housing 46 where the opening of the conduit section 29a is located. A cutter bar 52 at the trailing side of this opening 29a, with respect to the movement of the knives, cooperates with the knives to chop the alfalfa leaves and stems into smaller particles which will be blown into the conduit 29b by the action of the turbine blades 48.

Figure 9:
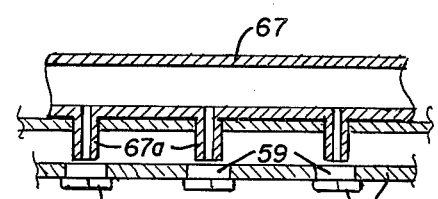
FIG. 9 is a fragmentary sectional detail as taken from the indicated line 9—9 at FIG. 6 but on an enlarged scale.
Figure 5:
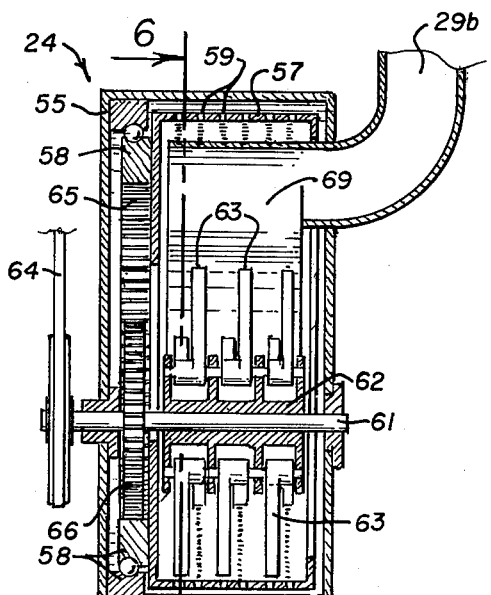
FIG. 5 is a sectional view of a hammermill unit, as taken from the indicated line 5—5 at FIG. 1, but on an enlarged scale.
Figure 7:
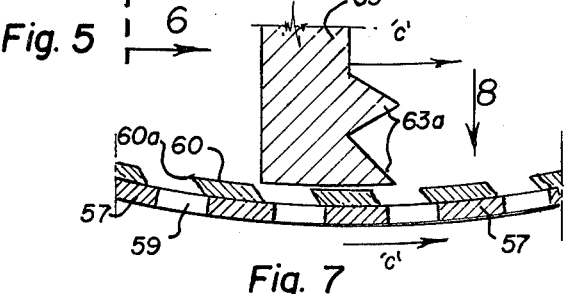
FIG. 7 is a fragmentary section of the apparatus as shown at FIG. 6 but on a further enlarged scale and with arrows indicating the direction of movements of the components.
Figure 8:
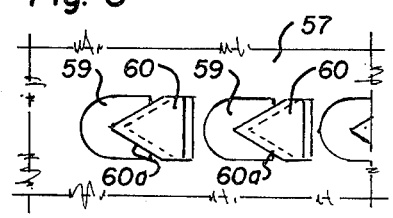
FIG. 8 is a fragmentary detail view as taken from the indicated arrow 8 at FIG. 7.
Figures 11, 12, 13:
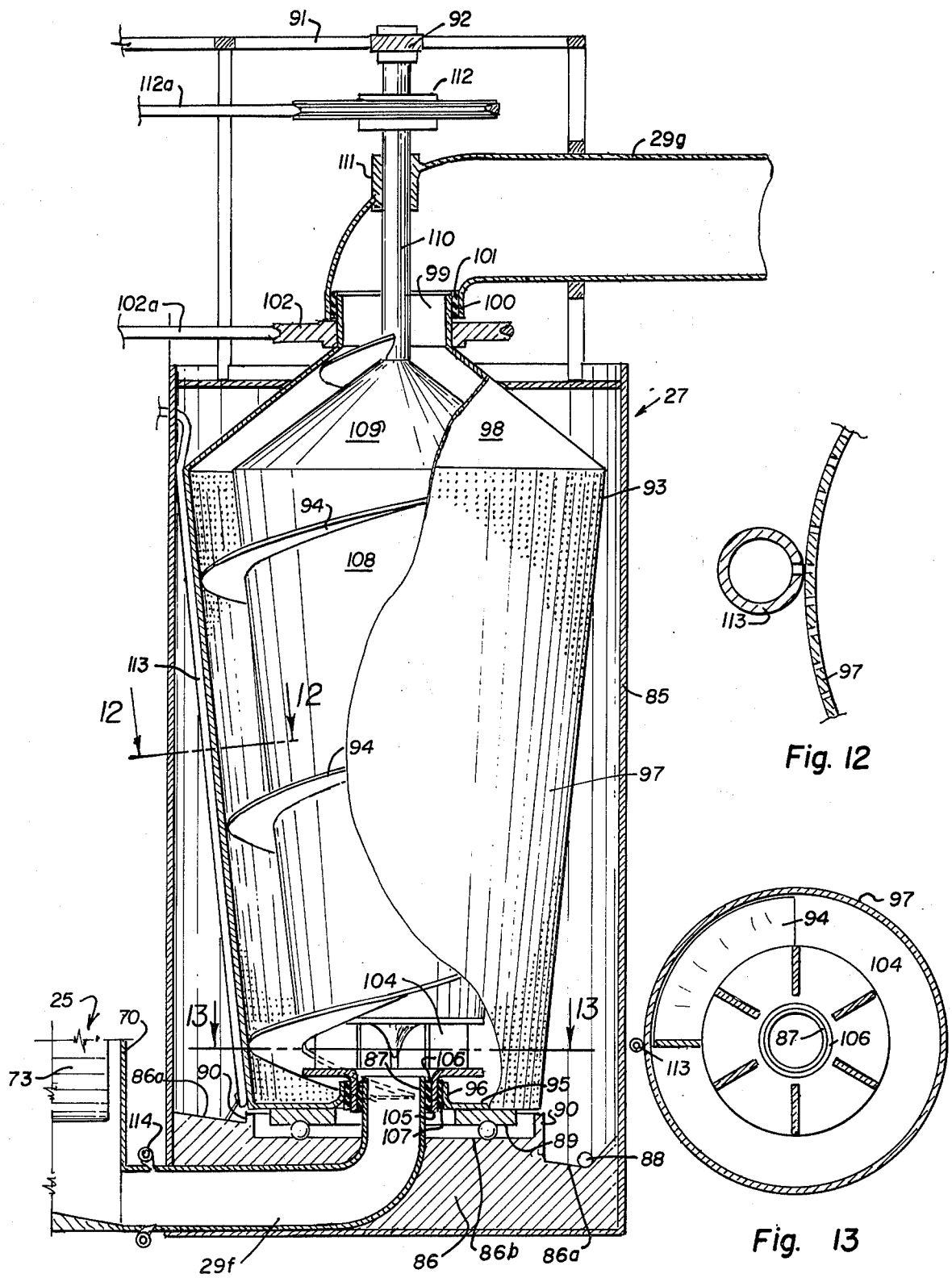
FIG. 11 is a sectional view as taken from the indicated line 11—11 at FIG. 2 but on an enlarged scale.
FIG. 12 is a fragmentary sectional detail as taken from the indicated line 12—12 at FIG. 11 but on a further enlarged scale.
FIG. 13 is a sectional detail as taken from the indicated line 13—13 at FIG. 11.

The conduit 29b extends to a side wall of the housing 55 of the hammer mill 24 to form an intake. This housing is cylindrical in form with a tangential discharge opening 56 extended to the conduit 29c for movement of the crushed alfalfa to the roll press 25. This hammer mill 24, of an improved construction, includes a rotating drum 57 carried within the housing on a suitable bearing race 58 at one side of the housing 55 and drum 57 as illustrated at FIG. 5. The periphery of this drum is sieved as at 59 to allow passage of only small particles of alfalfa which will be forced through the sieve openings by action of the hammer mill. These sieve openings 59 may be circular holes in the drum or may be of a modified construction as shown at FIGS. 7, 8 and 9. In this improved construction, the sieve openings 59 are not necessarily circular but they may be squared at one side as illustrated, or for that matter, of various similar shapes. A cap piece 60 partially covers each sieve opening 59a and the leading edge 60a of each cap piece overhangs a portion of the sieve openings and is sharpened to better cut alfalfa leaves and stems as the blades of the hammer mill push the alfalfa against the drum and through the sieve openings. It is to be noted that these cap pieces 60 may be integral with the drum by an upsetting and offsetting operation in their manufacture, although they are shown as separate pieces.

A shaft 61 extends transversely through the housing 55, below the axial center of the housing and drum to carry the hammer mill hub 62. Hammer mill arms 63 are pivoted on this hub in a conventional arrangement. However, spurs 63a may be located at the base of each arm 63 to better chop the material in the mill. This shaft 61 connects with a belt-pulley drive 64 extended from the engine 28.

Figure 3:
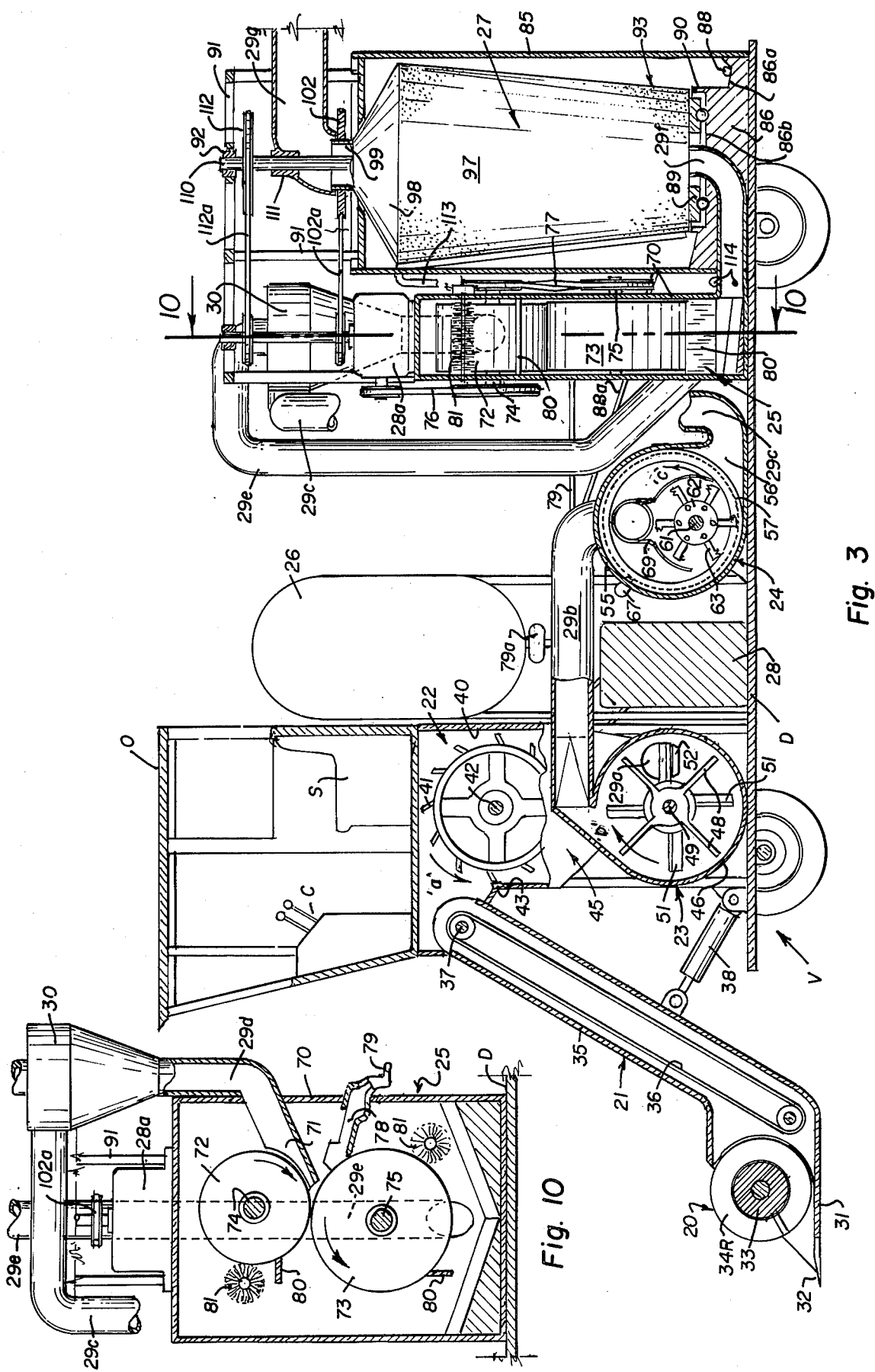
FIG. 3 is a side elevational view similar to FIG. 1 but with wall portions and other parts broken away to show components otherwise hidden from view.
Figure 4:
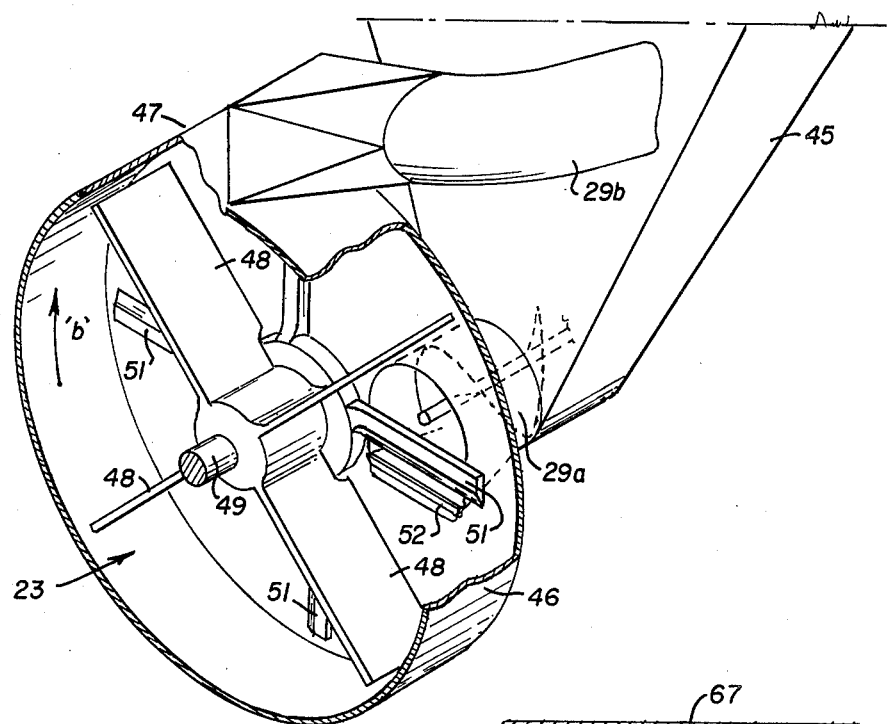
FIG. 4 is an enlarged isometric sectional view of a blower-chopper unit in the apparatus.
Figure 6:
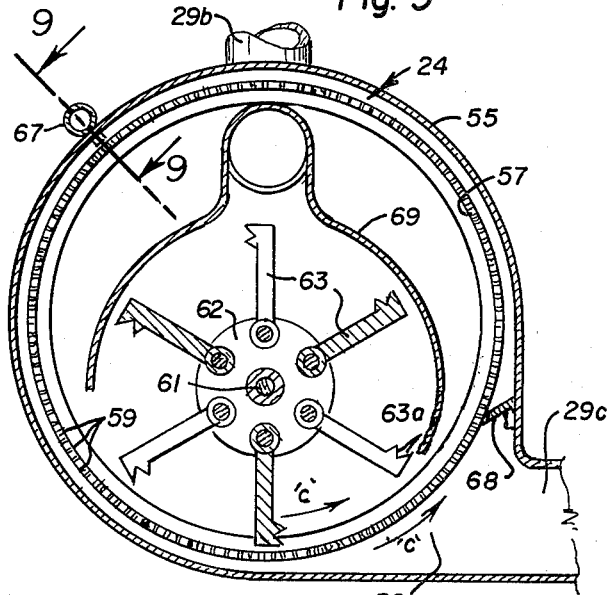
FIG. 6 is a sectional view as taken from the indicated line 6—6 at FIG. 5.

The drive shaft 61 rotates the hammer mill and is also geared to rotate the drum 57 in the same direction but at a slower rate and as in the direction of the indicated arrows 'c' at FIGS. 3, 6 and 7. The inner wall of the bearing race 58 on the drum carries an internal gear 65 while the shaft 61 carries a spur gear 66 meshing with the internal gear 65 as illustrated at FIG. 5. With this arrangement the hammer mill forces particles of alfalfa through all of the sieve openings 59 as rotation of the drum continues and in a direction which throws the particles of alfalfa tangentially into the discharge opening 56 for their movement into the conduit 29c. An air jet manifold 67 having nozzles 67a directed into the sieve openings 59a, as shown at FIG. 9, is provided to keep the sieve openings clean and clear of any material which would clog and build the openings. Also, this jet manifold, or an equivalent thereto, may be used to add liquid or a gas such as ammonia when it is necessary to condition the pulp before pressing. Also scrapers 68 are provided to keep the outer wall of the drum free of material. To complete this organization, a hood 69 within the drum extends from the intake opening, at conduit 29b, and over the hammer mill arms 63 as best shown at FIG. 6. This hood will better direct the ground alfalfa into the rotating hammer to enhance the effectiveness of the grinding operation.

The three grinding units in sequence, with each chopping and grinding the alfalfa to smaller particles permit a more efficient grinding operation and an apparatus capable of handling a maximum possible amount of alfalfa. It is a wet pulp by the time it passes through the hammer mill 24. It is important to disrupt and rupture the cell structure of the alfalfa leaves and stems to extract the nutrient liquid therefrom and the operation above described accomplishes this purpose by preparing the alfalfa for the roll press.

The movement of the alfalfa pulp through conduit 29c brings the pulp into the cyclone 30 where the pulp is separated from the air flow. The pulp drops from the cyclone, through conduit 29d, best shown at FIG. 10, and thence into the housing 70 of the roll press 25 where it moves down a chute 71 and thence, between an upper roll 72 and a lower roll 73 to press the liquid therefrom. These rolls are carried on shafts 74 and 75 respectively. At the same time, the air discharges from the top of the cyclone into conduit 29e to return to the bottom of the roll press housing 70 to better eject the fiber remaining from the pulp after the liquid is extracted from it.

The shaft 74 of the upper roll 72 is connected to the motor 28a by a belt-pulley 76, with the motor 28a being conveniently mounted upon the roll press housing 70. The two rolls are operatively interconnected by a belt-pulley arrangement 77 in which the belt is crossed in a figure-8 arrangement so that the rotation of the rolls are in opposite directions as indicated by arrows at FIG. 10. It is contemplated that the peripheral rates of movement will be slightly different to provide for a kneading action as the rolls squeeze pulp between them. The liquid squeezed from the pulp will be picked up by a chute 78 engaging the lower roll, with the liquid flowing into a conduit 79 to the tank 26. A suitable pump 79a is provided in the conduit 79 for this purpose. The flow of fluid to the tank is with conventional components and need not be further described.

The alfalfa pulp with the liquid squeezed from it can be referred to as alfalfa fiber and any fiber sticking to the rolls is removed by scrapers 80. Roller brushes 81, powered by motors 28b are used to further clean the rolls as they rotate. Once the fiber drops from the rolls it is directed into a conduit section 29d to the centrifuge 27. The air flow into the bottom of the housing 70 from conduit 29e facilitates this movement of fiber.

The centrifuge 27 is housed within an upright cylindrical tank 85 located adjacent to, and behind the roll press 25 so that the centrifuge may be operatively connected with the motor 28a as will be described. The tank 85 has a raised bottom 86 to permit the conduit 29d to turn upwardly at the axis of the tank to form a short axial bearing ring 87 whereon the centrifuge components rotate. An outer ring shaped portion 86a of the base 86 is shaped downwardly to a fluid outlet 88 which connects with the conduit 79 directed to the storage tank and the inner flat circular portion 86b forms a thrust bearing race 89 to support the centrifuge. A wall 90 separates these sections. The housing is completed by a framework 91 above the tank 85 and also extends above the roll press 25 to support a shaft of motor 28a; also to support a horizontal discharge conduit 29e and support a top shaft bearing 92 for a centrifuge component.

The centrifuge includes an outer drum sieve 93 and an inner auger flite 94. The drum sieve 93 is formed with a flat bottom 95 having a short cylindrical upturned lip 96 at its center. A sieve-wall 97 extends upwardly as a slightly diverging cone. This sieve wall 97 is capped by a sharply converging cone 98 having an upstanding cylindrical top 99. This top is fitted into a short bearing ring 100 at the base of a downturned elbow portion of the discharge conduit 29e, and a bearing sleeve 101 of a selected plastic material such as nylon is disposed between the top 99 and bearing ring 100. To complete this outer drum, a pulley 102 is affixed to the top 99 below the bearing ring 100 for connection with a pulley-belt arrangement 102a, connecting with the shaft of motor 28a.

The inner auger flite 94 is formed with a flat, circular blower 104 at its base to supplement the blower-chopper 23. This blower 104 has a downturned circular lip 105 which fits about the conduit bearing ring 87 with an anti-friction bearing sleeve 106 of a selected plastic material being between the two. The lip 96 of the drum bottom extends about the lip 105 and a plastic bearing sleeve 107 is between these two lips. The auger flite 94 includes a core shell 108 which extends upwardly from the blower as a slightly diverging cone and is capped by a sharply converging cone 109. A shaft 110 extends from the apex of the cone 109, upwardly through a bearing 111 in the elbow of the conduit 29e and to the top shaft bearing 92 held by framework 91. A pulley 112 is affixed to the shaft 110 above the elbow bearing 111 for connection with a pulley belt arrangement 112a connecting with the shaft of motor 28a.

The auger flite 94 extends about the conical core shell 98 and its conical top 99 in the space between this shell and top and the wall of the outer drum sieve 93. The pulley belt arrangements are such that the rotations of the drum sieve 93 and auger flite 94 are very rapid to impose centrifugal pressure on the fiber in the drum sieve pressing it against the sieve to extract moisture therefrom. At the same time, there is a differential rotation between the drum sieve 93 and auger flite 94 such that the auger moves the fiber upwardly through the centrifuge for discharge through the conduit 29e. An air manifold 113 is provided at the wall 97 of the drum sieve 93 to blow fiber from the holes of the sieve 97 and prevent the sieve from blinding or plugging up.

A considerable variation of moisture will be in the fiber moving through the roll press 25 and this variation is considerably reduced by the centrifuge. However, it may be necessary to provide additional water or other solution to the fiber. This may be done by a circular water manifold 114 in the conduit 29d. It is contemplated that water or solution can be stored in a tank 115, connected to a manifold by a line 114a, as indicated at FIG. 3. The water or solution can be added to leach out soluble components in the fiber, or added to increase the moisture content of the final product. The rate at which the centrifuge rotates will control the amount of moisture removed from or left in the fiber.

The operation of the unit is manifest from the foregoing description. The alfalfa is ground to a pulp by the grinders 22 and 23 and the hammer mill 24. Most liquid is squeezed from the pump by the roll press and the remaining fiber is treated in the centrifuge which may control the moisture content to render the fiber suitable for pelletization. The advantage of the centrifuge lies in the versatile control of the fiber. If it is too moist, additional liquid can be removed. If it is too dry, liquid, water or a nutrient solution can be added at the circular manifold 114 in conduit 29d. Where it is ascertained that desirable residual soluble substances are in the fiber, an excess of liquid, which may be water, can be added at the manifold 114. The liquid will dissolve or dilute the desirable substances which are then removed by the centrifuge. Likewise, additional water can be injected into the pulp before it enters the roll press 25, at any convenient location, preferably through the nozzles 67a of the hammer mill or at any other suitable location such as the intake or discharge of the hammer mill 24. This expedient can advantageously extract the values from the alfalfa or similar crop, where for example, crop juices become sticky as the pulp is formed.

The fiber, blown from the conduit 29g, can be discharged into a trailing wagon and subsequently stacked, stored in sheds or run through a pelletizing unit. In any form, the fiber can be used as livestock feed. The liquid protein can be used as food for humans and this apparatus can be part of a system to reduce the overall cost of food and can help to prevent starvation.

I have now described my invention in considerable detail. However, it is obvious that others skilled in the art can devise and build alternate and equivalent constructions which are within the scope and spirit of my invention. Hence, I desire that my protection be limited, not by the construction shown and described, but only by the proper scope of the appended claims.

What is claimed is:

1. In the combination of a harvesting apparatus adapted to move through a field of vegetation having a liquid component and a fiber component to mow and gather the vegetation, a processing means to grind the vegetation to a pulp as it is received, extract and collect the liquid component thereof and discharge the fiber therefrom, wherein a grinding means includes:

a cylindrical screen rotating on a generally horizontal axis;

rotating means provided with pivoted hammers whose circle of maximum extension is less than the interior diameter of said screen, said hammers moving close to the lower inside portion of said screen for grinding; and means spaced from the path of said hammers for forcing material inwardly through the holes in said screen.

2. The combination defined in claim 1, wherein the processing means further includes:

a press means to compress the pulp to separate the liquid component from the fiber component; and a conditioning means to treat the fiber component to adjust the moisture content therein to a selected value before the fiber is discharged.

3. In the combination defined in claim 1, wherein:

the screen perforations are formed with a sharp, raised inner surface to facilitate cutting the vegetation pieces into smaller pieces as the hammers move past the perforations.

4. The combination defined in claim 2 wherein the press means comprise:

(a) a pair of rollers within a housing;
(b) a guide means to direct the pulp into the housing and between the rollers for pressing liquid therefrom as the rollers rotate;
(c) a trough to catch liquid pressed from the pulp and to direct it to a conduit for collection; and
(d) means to discharge the fiber from the housing after the liquid is pressed therefrom.

5. The combination defined in claim 4, wherein an air flow means directs pulp to the guide means and said air flow means is diverted, to be directed to blow the upwatered fiber from the housing.

6. In the combination of a harvesting apparatus adapted to move through a field of vegetation having a liquid component and a fiber component to mow and gather the vegetation, a processing means to grind the vegetation to a pulp as it is received, extract and collect the liquid component thereof and discharge the fiber therefrom, a press means to compress the pulp to separate the liquid component from the fiber component and a conditioning means to treat the fiber component to adjust the moisture content therein to a selected value before the fiber is discharged, wherein the fiber conditioning means includes:

a centrifuge means to receive the pressed fiber and to extract any excess moisture remaining in the fiber after pressing the same and being adapted to leave a selected residual amount of moisture in the fiber such that the fiber is suitable for pelletizing.

7. The combination defined in claim 6 including a means to add supplemental moisture to the fiber before the fiber is introduced into the centrifuge means.

8. The combination defined in claim 6 wherein the centrifuge means include:

(a) a vertically axised drum sieve adapted to rotate at high speed;
(b) means to introduce the fiber at the bottom of the sieve;
(c) a discharge conduit at the top of the sieve; and
(d) means to continuously move the fiber along the wall of the drum sieve as it rotates, from the bottom of the discharge at the top thereof.

9. The combination defined in claim 8 wherein the moving means comprises:

(a) an auger flite whose axis is concentric with the drum sieve reaching to the inner wall of the sieve; and (b) means to rotate the auger flite at a rate not greatly different than the rotation of the drum sieve to produce a relatively slow rotation of the auger with respect to the rotation of the drum sieve.

10. The combination defined in claim 9 including compressed air means to prevent the fiber from clogging the drum sieve.

11. In the combination defined in claim 1, wherein: said means for forcing material inwardly through the holes in said screen comprises means directing air toward said screen.

12. In the combination defined in claim 1, including: a hood enclosing the upper portion of the path of movement of said hammers; and means for supplying vegetation to be ground to the interior of said hood above the path of said hammers.

13. In the combination of claim 12, wherein: said means for forcing material inwardly through said screen is disposed at a position above the lower end of said hood.

14. In the combination of claim 1, including: scraper means engageable with the exterior of said screen to dislodge material adhering to the outside of said screen or protruding through said holes.

15. In the combination of claim 1, including a means for rotating the cylindrical screen and the hammers in the same direction but at different speeds.

* * * * *

UNITED STATES PATENT AND TRADEMARK OFFICE
CERTIFICATE OF CORRECTION

PATENT NO. : 4,287,708
DATED : September 8, 1981
INVENTOR(S) : Allan B. Neely, Jr.

It is certified that error appears in the above—identified patent and that said Letters Patent is hereby corrected as shown below:

On the title page, Inventor should read

-- Allan B. Neely, Jr. --

Column 5, line 24, "build" should read -- blind --.

Signed and Sealed this

Thirtieth Day of March 1982

[SEAL]

Attest:

Attesting Officer

GERALD J. MOSSINGHOFF
*Commissioner of Patents and Trademarks*